(12) United States Patent
Jungerman et al.

(10) Patent No.: US 8,610,425 B2
(45) Date of Patent: Dec. 17, 2013

(54) SOLAR MONITOR FOR SOLAR DEVICE

(75) Inventors: Roger L Jungerman, Petaluma, CA (US); Randall King, Santa Rosa, CA (US)

(73) Assignee: Solmetric Corporation, Sebastopol, CA (US)

( * ) Notice: Subject to any disclaimer, the term of this patent is extended or adjusted under 35 U.S.C. 154(b) by 571 days.

(21) Appl. No.: 12/799,951

(22) Filed: May 4, 2010

(65) Prior Publication Data
US 2011/0273163 A1    Nov. 10, 2011

(51) Int. Cl.
G01R 1/20    (2006.01)
(52) U.S. Cl.
USPC .......................................... 324/126; 324/111
(58) Field of Classification Search
USPC ....................................................... 324/126
See application file for complete search history.

(56) References Cited

U.S. PATENT DOCUMENTS

| 4,456,880 | A | 6/1984 | Warner et al. | |
|---|---|---|---|---|
| 6,914,418 | B2 * | 7/2005 | Sung | 320/140 |
| 7,164,263 | B2 | 1/2007 | Yakymyshyn et al. | |
| 7,710,752 | B2 * | 5/2010 | West | 363/71 |
| 8,004,117 | B2 * | 8/2011 | Adest et al. | 307/80 |
| 8,212,399 | B2 * | 7/2012 | Besser et al. | 307/52 |
| 2006/0225781 | A1 * | 10/2006 | Locher | 136/245 |

OTHER PUBLICATIONS

D.L.King et al., Dark Current-Voltage Measurements on Photovoltaic Modules as a Diagnostic or Manufacturing Tool, 26th IEEE Photovoltaic Specialists Conference, Sep. 29, 1997.

* cited by examiner

*Primary Examiner* — Thomas Valone
(74) *Attorney, Agent, or Firm* — Coastal Patent Law Group, P.C.; Joshua S. Schoonover

(57) ABSTRACT

A solar monitor measures electrical characteristics of a designated solar device within an array of solar devices that are coupled in series. The solar monitor includes a charge storage element and a charger coupled to the charge storage element to establish a positive voltage and/or a negative voltage on the charge storage element. A switch within the solar monitor is coupled in a shunt configuration with the designated solar device and with a subsequent device in the array. The switch selectively couples the charge storage element to the designated solar device to vary an operating current that flows between the designated solar device and the subsequent solar device. The solar monitor includes a current detector to measure the current of the designated solar device, and a voltage detector to measure the voltage of the designated solar device.

20 Claims, 6 Drawing Sheets

US 8,610,425 B2

SOLAR MONITOR FOR SOLAR DEVICE

CROSS-REFERENCE TO RELATED APPLICATIONS

N/A

BACKGROUND OF THE INVENTION

Photovoltaic (PV) systems are ubiquitous contributors to worldwide energy production. Solar panels within PV systems convert incident sunlight into electrical energy that may be fed through an inverter to a utility power grid, stored in battery banks or locally consumed. The solar panels have a long specified operating life and are typically installed on rooftops and other sites that may be difficult to access during the operating life. Accordingly, it is desirable to monitor the performance of the solar panels to detect degradation due to aging, faults, or environmental conditions, because even minor degradation in performance of one or more solar panels can deprive the PV system of significant energy production over the long operating life of the solar panels.

Inverters within PV systems that are coupled to the utility power grid, or "grid-tied", typically have capability to monitor the total operating voltage and total operating current cumulatively provided by all of the solar panels within the PV system. While this monitoring capability provides a useful performance measure for the entire PV system, it does not enable detection of subtle degradations within the solar panels.

Electrical characteristics, such as current-voltage, or "I-V", characteristics, of the solar panels are definitive indicators of the performance and integrity of the solar panels, and may be used to detect even subtle degradations of the solar panels. The I-V characteristics of individual solar panels may be measured using traditional curve tracers in manufacturing facilities, prior to integration into a PV system. These measurements, disclosed for example by Warner et al. in U.S. Pat. No. 4,456,880, titled I-V Curve Tracer Employing Parametric Sampling, provide a baseline performance measure for the individual solar panels in the manufacturing environment, but do not provide for on-going monitoring of the solar panels once the solar panels are installed and are operating in a PV system.

The I-V characteristics of one or more solar panels may also be measured upon installation of the solar panels in a PV system to provide a cumulative baseline performance measure for all of the solar panels in the operating environment of the installation site. However, this measurement typically relies on disconnecting the solar panels from the rest of the PV system and disrupting operation of the PV system, which makes this type of measurement too intrusive for monitoring performance and detecting degradation of the solar panels within an installed PV system.

In view of the above, there is a need for a solar monitor that measures electrical characteristics of solar panels during the operating life of an installed PV system, without significantly disrupting the operation of the PV system.

SUMMARY OF THE INVENTION

A solar monitor according to embodiments of the present invention measures electrical characteristics of a designated solar device within an array of solar devices that are coupled in series. The solar monitor includes a charge storage element and a charger coupled to the charge storage element to establish a positive voltage and/or a negative voltage on the charge storage element. A switch within the solar monitor is coupled in a shunt configuration with the designated solar device and with a subsequent device in the array. The switch selectively couples the charge storage element to the designated solar device to vary an operating current that flows between the designated solar device and the subsequent solar device. The solar monitor includes a current detector to measure the current of the designated solar device, and a voltage detector to measure the voltage of the designated solar device.

BRIEF DESCRIPTION OF THE DRAWINGS

The present invention can be better understood with reference to the following Figures. The components in the Figures are not necessarily to scale. Emphasis is instead placed upon illustrating the principles and elements of the present invention.

DETAILED DESCRIPTION OF THE INVENTION

Figure 1:
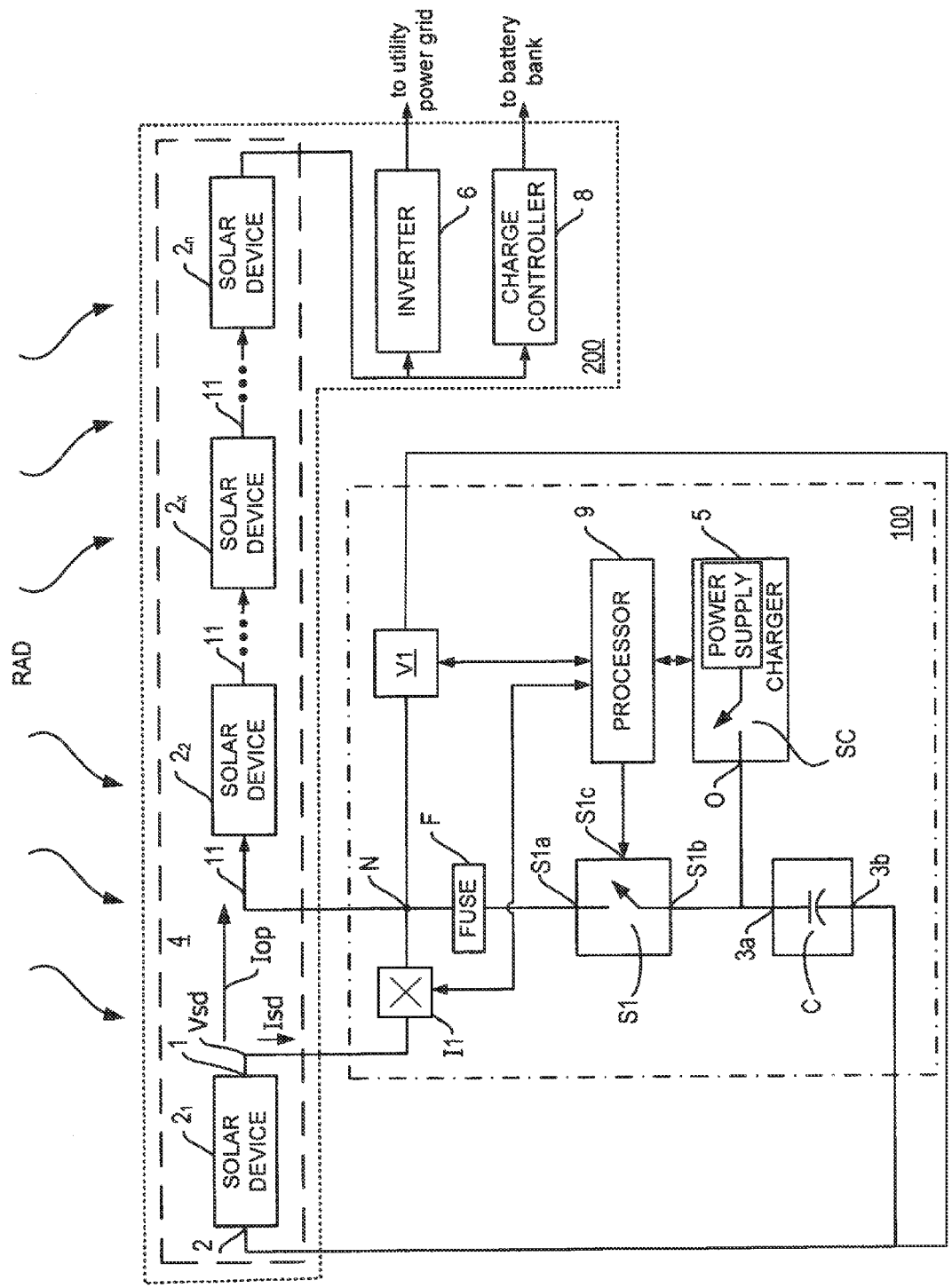
FIGS. 1-4 show examples of block diagrams of a solar monitor according to alternative embodiments of the present invention.

FIG. 1 shows an example of a block diagram of a solar monitor 100, according to embodiments of the present invention, coupled to a solar device $2_1$ within a PV system 200. The solar device $2_1$ typically includes one or more solar panels, such as photovoltaic panels, solar cells or other devices, elements or systems that are suitable for converting incident solar radiation RAD into electrical power.

In this example, the PV system 200 includes an array 4 of two or more solar devices $2_1$-$2_n$ that are coupled in series. Each of the solar devices, in turn, may include one or more devices, elements, or systems in a series and/or shunt arrangement. The PV system 200 may alternatively include two or more of the arrays 4 in a series or parallel arrangement. During operation of the PV system 200, an operating current Iop flows between the two or more solar devices $2_1$-$2_n$ that are coupled in series. In this example, the operating current Iop flows between the solar device $2_1$ and a subsequent solar device in the array 4. The subsequent solar device may include the solar device $2_2$, additional solar devices in the array 4, the inverter 6, or any of one or more elements of the PV system 200 that are coupled in series with the solar device $2_1$ or with any other of the designated solar devices in the array 4. The operating current Iop typically refers to currents that are provided by the two or more solar devices $2_1$-$2_n$ in response to the incident solar radiation RAD. The operating current Iop may also refer to substantially smaller currents, such as "dark" currents that may be provided by the two or more solar devices $2_1$-$2_n$ in the absence of the incident solar radiation RAD on one or more of the solar devices $2_1$-$2_n$. Alternatively, the operating current Iop may refer to, or include, any other current that may flow between a designated solar device and a subsequent solar device in the array 4 of two or more solar devices $2_1$-$2_n$, when the solar devices $2_1$-$2_n$ within the array 4 are coupled in series or otherwise configured for operation or use in the PV system 200.

The output of the last solar device $2_n$ in the array 4 is shown coupled to an inverter 6. In a typical "grid-tied" PV system 200, the inverter 6 is coupled to a utility power grid (not shown). In alternative examples, the PV system 200 includes a charge controller 8 that delivers power provided by the solar devices $2_1$-$2_n$ to a battery bank or other type of energy storage system (not shown). While the inverter 6 and the charge controller 8 are shown included within the PV system 200, the PV system 200 may include neither the inverter 6 nor charge controller 8, or just one of the inverter 6 and charge controller 8, depending on the application of the PV system 200. The PV system 200 may include other types of devices, elements or systems that are suitable for interfacing to the array 4 of solar devices $2_1$-$2_n$ that are coupled in series.

The solar monitor 100 is configured to monitor the electrical characteristics at a first port 1 of the first solar device $2_1$ in the array 4. In other examples, the solar monitor 100 is configured to monitor or measure electrical characteristics of any other of the solar devices $2_1$-$2_n$ in the array 4 by coupling the solar monitor 100 to another solar device $2_x$ or subset of solar devices in the array 4. The subscript "x" is an integer variable that designates which solar device $2_x$ in the array 4 of solar devices $2_1$-$2_n$ is monitored by the solar monitor 100, where $1 \leq x \leq n$ and where n represents the number of solar devices in the array 4.

The solar monitor 100 includes a switch S1 that has a first contact S1a, a second contact S1b, and a control port S1c. The first contact S1a is coupled to the first port 1 of the solar device $2_1$, which couples the switch S1 in a shunt configuration with the solar device $2_1$ and with the subsequent solar device in the array 4 of solar devices $2_1$-$2_n$ that are coupled in series. In this example, the first contact S1a of the switch S1 is coupled to the first port 1 of the solar device $2_1$ through an optionally included fuse F and a current detector I1. The switch S1 may be implemented using a high current switching transistor such as an Insulated Gate Bipolar Transistor (IGBT) provided by MITSUBISHI ELECTRIC, an electromechanical relay, mechanical switch, other type of semiconductor device, or series of devices. The switch S1 is alternatively implemented using any other type of device, element, or system suitable for providing switching at the currents and voltages presented at the contacts S1a, S1b. In an example wherein the solar monitor 100 is configured to monitor a solar device $2_x$ that includes a single solar panel, the voltage present between the first contact S1a and the second contact S1b of the switch S1 typically does not exceed one hundred volts and the current between the first contact S1a and the second contact S1b of the switch S1 typically does not exceed ten amperes. However, in examples wherein the solar monitor 100 is configured to monitor a solar device $2_x$ that includes multiple solar panels in a series configuration, the voltage present between the first contact S1a and the second contact S1b of the switch S1 may exceed several hundred volts. The type of device, element or system that is used to implement the switch S1 may be selected according to the configuration of the PV system 200, or according to the coupling configuration of the solar monitor 100 to the PV system 200.

The solar monitor 100 includes a charge storage element C that has a first terminal 3a coupled to the second contact S1b of the switch S1. A second terminal 3b of the charge storage element C is coupled to the second port 2 of the solar device $2_1$. The charge storage element C is typically implemented using one or more electrolytic capacitors. The capacitance of the charge storage element C is typically larger than the capacitance that is associated with each of the solar devices $2_1$-$2_n$, which enables the charge storage element C to provide sufficiently large voltages and corresponding currents to the solar device $2_1$ upon activation of the switch S1.

The solar monitor 100 includes a charger 5 having an output O that is coupled to the first terminal 3a of the charge storage element C. The charger 5 is typically implemented using a DC-DC converter or other power supply that is suitable to provide voltages and currents to the charge storage device C that are sufficiently high to perform measurements of the electrical characteristics of the solar device $2_1$. The current that the charger 5 provides to the charge storage element C is sufficiently large to enable the solar monitor 100 to perform measurements of a solar device $2_1$ at a designated measurement interval. In one example, the charger 5 provides a current at the output O of approximately 100 mA, which enables the solar monitor 100 to perform a measurement of the solar device $2_x$ at least every several seconds. Through internal switching, or by including two power supplies of opposite polarity, the charger 5, typically under control of the processor 9, provides either a positive charge on the terminal 3a of the charge storage element C or a negative charge on the terminal 3a of the charge storage element C, so that a positive voltage or a negative voltage, respectively, may be selectively provided between the terminals 3a, 3b of the charge storage element C.

The solar monitor 100 includes a voltage detector V1 coupled between a ground or other suitable voltage reference, and a node N. The voltage detector V1 typically includes a voltage probe (not shown) and an analog-to-digital converter, a voltmeter, a data acquisition system, or other type of device, element or system suitable for measuring or otherwise determining the voltage at the node N. The node N is typically located in a signal path between the first port 1 of the solar device $2_1$ and the first terminal 3a of the charge storage element C, or at any other designated position in the solar monitor 100 or the PV system 200 that is suitable to provide an indication of the voltage Vsd present at the port one 1 of the solar device $2_1$. In an example wherein the node N is positioned between the fuse F and the switch S1, voltage measurements acquired at the node N may be compensated for the voltage drops that may occur across the fuse F due to inherent resistance of the fuse F. In an example wherein the node N is positioned at the first terminal 3a of the charge storage element C, voltage measurements acquired at the node N may also be compensated for voltage drops that may occur across the switch S1 due to the inherent "on" resistance associated with the switch S1 when the switch S1 is closed. Compensation is typically provided by the processor 9, which typically interfaces with the control port S1c of switch S1, the charger 5, the current detector I1, the voltage detector V1, and other devices, elements, or systems associated with the solar monitor 100 or the PV system 200. The processor 9 typically has an associated memory (not shown).

The solar monitor 100 also includes a current detector I1 that is coupled to the first port 1 of the solar device $2_1$ and configured to indicate the current Isd that is present at the first port 1 of the solar device $2_1$. In one example, the current detector I1 is implemented with a Hall Effect Sensor (not shown), as disclosed for example in U.S. Pat. No. 7,164,263, issued on 16 Jan. 2007 to Yakymyshyn et al. This type of current detector I1 is typically clamped on or otherwise disposed about one or more conductors 11 that carry currents between solar devices $2_1$ within the array 4 of solar devices $2_1$-$2_n$ within the PV system 200. Because the Hall Effect Sensor is not interposed in the signal path of the PV system 200, a failure of this type of current detector I1 typically will not induce a failure in the PV system 200, or typically will not otherwise impair operation or energy production by the PV system 200.

Figure 2:
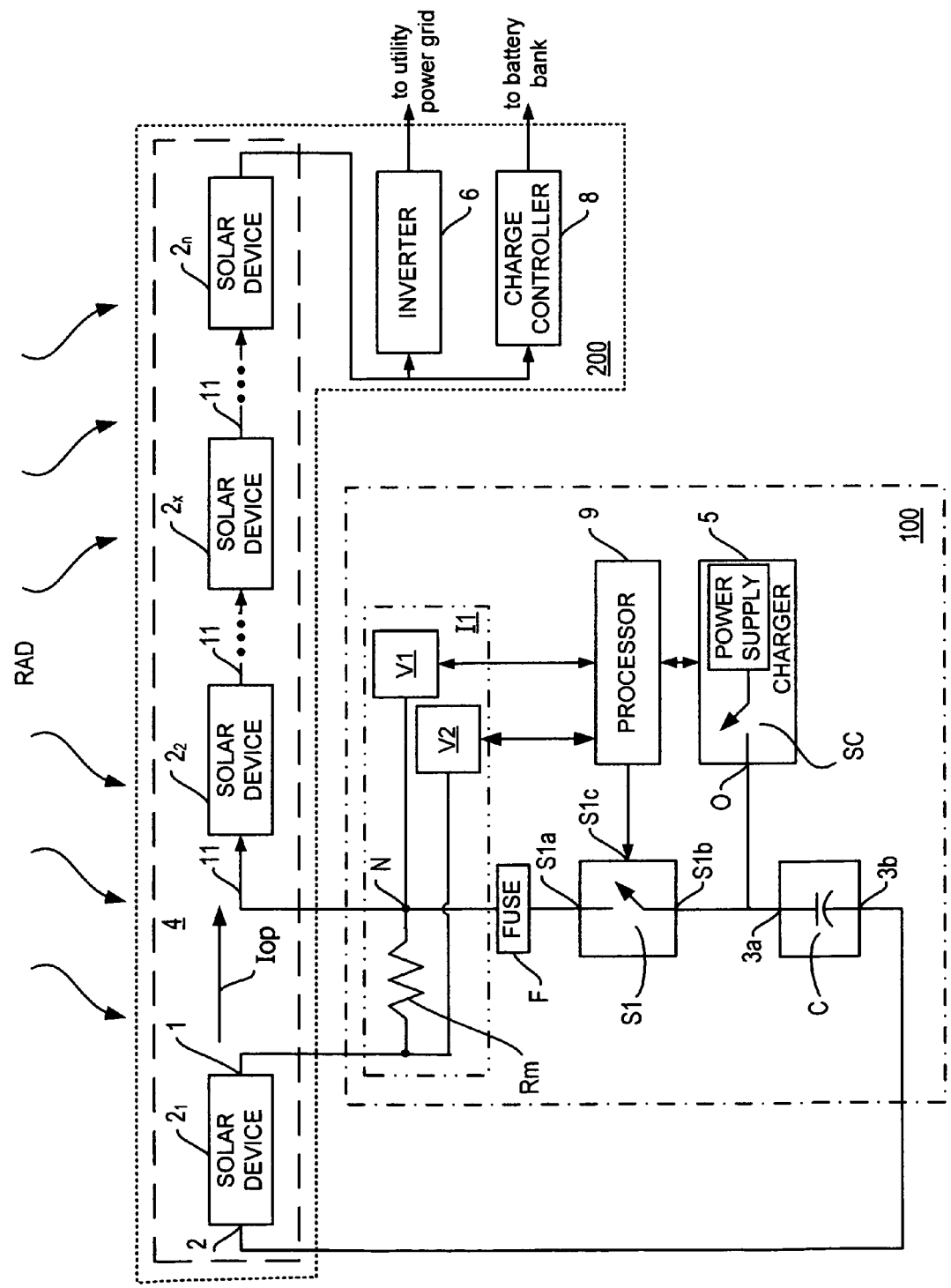

FIG. 2 shows another example of the solar monitor 100 wherein the current detector I1 is implemented using the voltage detector V1, a voltage detector V2, and a resistive element Rm. The voltage detector V2 typically includes a voltage probe (not shown) and an analog-to-digital converter, a voltmeter, a data acquisition system, or other type of device, element or system suitable for measuring or otherwise determining the voltage at a terminal of the resistive element Rm that is opposite from the terminal that is coupled to the node N. The resistive element Rm in one example is a temperature-stable, low value resistor. The resistance of the resistive element Rm is typically less than one ohm or is otherwise sufficiently low so as to not dissipate sufficient power to impair operation of the PV system 200. The resistive element Rm is alternatively implemented using a designated length of one or more of the conductors 11 that connect the solar devices $2_1$-$2_n$ within the array 4 or that are otherwise associated with the solar device $2_1$. In this implementation, the resistive element Rm is established based on the cross-sectional area, the material type of the conductor 11, and the length of a portion of the conductor 11 that is defined by the physical separation between the voltage detectors V1, V2. The voltage detectors V1, V2 and all of the elements of the solar monitor 100 that are coupled in shunt with the PV system 200 typically have high input impedances, so that operation of the solar monitor 100 or even a failure of one or more elements of the solar monitor 100, typically will not induce a corresponding failure in the PV system 200 or otherwise impair operation or energy production of the PV system 200. To further isolate the solar monitor 100 from the PV system 200, the voltage detectors V1, V2 may each be optionally coupled to terminals of the resistive element Rm through a corresponding series fuse (not shown). This implementation of the current detector I1 isolates the PV system 200 from failures that may occur in the solar monitor 100 and enables the elements of the solar monitor 100 to be located remotely from the stringent environmental conditions of the installation sites of the PV system 200, which typically increases reliability of the solar monitor 100.

To acquire a first measure M1 of electrical characteristics of the solar device $2_1$, such as a portion of an I-V characteristic 7 (shown in the example of FIG. 6), the processor 9 activates the control port S1c to open the switch S1, which establishes a high impedance between the first contact S1a and the second contact S1b. With switch S1 open, the processor 9 configures the charger 5 to provide a negative charge, and corresponding negative voltage, between the first terminal 3a and the second terminal 3b of the charge storage element C. The processor 9 then decouples the charger 5 from the charge storage element C, typically by opening an optionally included switch SC or by otherwise providing a high impedance at the output O of the charger 5. The processor 9 then activates the control port S1c to close the switch S1, which establishes a low impedance between the first contact S1a and the second contact S1b of the switch S1. Closing the switch S1 decreases the operating current Iop between the solar device $2_1$ and the subsequent solar device in the array 4 in response to the negative charge provided to the charge storage element C.

Figure 6:
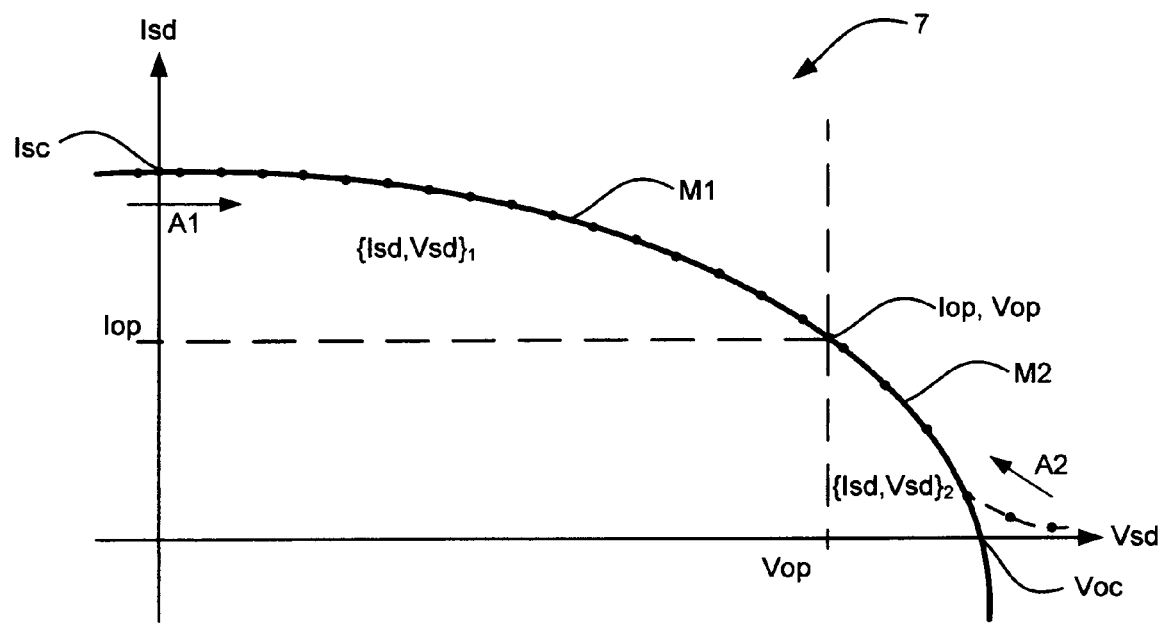
FIG. 6 shows an example of a current-voltage (I-V) characteristic for a solar device, established using the solar monitors according to embodiments of the present invention.

With the switch S1 closed, the voltage detector V1 monitors the voltage Vsd at the node N and the current detector I1 monitors the current Isd at the first port 1 of the solar device $2_1$ by acquiring a set $\{Isd,Vsd\}_1$ of corresponding measurements of the current Isd and measurements of the voltage Vsd, respectively, over a first designated time interval. While the current Isd and the voltage Vsd are typically analog currents and voltages, respectively, the acquired set $\{Isd,Vsd\}_1$ of corresponding measurements of the current Isd and measurements of the voltage Vsd includes samples of the current Isd and samples of the voltage Vsd, acquired by the current detector I1 and the voltage detector V1, respectively, at designated times within the first designated time interval. The samples in the set $\{Isd,Vsd\}_1$ of corresponding measurements of the current Isd and measurements of the voltage Vsd are typically acquired in the direction defined by an arrow A1 shown in FIG. 6. The processor 9 typically uses the acquired set $\{Isd,Vsd\}_1$ of corresponding measurements of the current Isd and measurements of the voltage Vsd in this first measure M1 of the electrical characteristics to establish a portion of an I-V characteristic 7 for the solar device $2_1$ that includes the short circuit current Isc and the operating voltage Vop of the solar device $2_1$ as shown in FIG. 6.

Series protection diodes (not shown) within each of the solar devices $2_1$-$2_n$ or the inherent electrical characteristics of the solar devices $2_1$-$2_n$ typically prevent current from other solar devices in the array 4 from flowing to the current detector I1, which could otherwise influence the first measure M1 of the electrical characteristics of the solar device $2_1$.

To acquire a second measure M2 of electrical characteristics of the solar device $2_1$, such as another portion of an I-V characteristic 7 (shown in the example of FIG. 6), the processor 9 activates the control port S1c to open the switch S1, which establishes a high impedance between the first contact S1a and the second contact S1b. With switch S1 open, the processor 9 configures the charger 5 to provide a positive charge, and corresponding positive voltage, between the first terminal 3a and the second terminal 3b of the charge storage element C. The positive voltage provided to the charge storage element C is sufficient to establish a voltage at the port 1 of the solar device $2_1$ that exceeds the open circuit voltage Voc of the solar device $2_1$. The processor 9 then decouples the charger 5 from the charge storage element C, typically by opening the optionally included switch SC or by otherwise providing a high impedance at the output O of the charger 5. The processor 9 then activates the control port S1c to close the switch S1, which establishes a low impedance between the first contact S1a and the second contact S1b of the switch S1. Closing the switch S1 increases the operating current Iop between the solar device $2_1$ and the subsequent solar device in the array 4 in response to the positive charge provided to the charge storage element C.

With the switch S1 closed, the voltage detector V1 then monitors the voltage Vsd between the reference and the node N and the current detector I1 monitors the current Isd at the first port 1 of the solar device $2_1$ by acquiring a set $\{Isd,Vsd\}_2$ of corresponding measurements of the current Isd and measurements of the voltage Vsd, respectively, over a second designated time interval. The acquired set $\{Isd,Vsd\}_2$ of corresponding measurements of the current Isd and measurements of the voltage Vsd includes samples that are typically acquired in the direction defined by an arrow A2 shown in FIG. 6. The processor 9 typically uses the acquired set $\{Isd,Vsd\}_2$ of corresponding measurements of the current Isd and measurements of the voltage Vsd in this second measure M2 of the electrical characteristics to establish a portion of an I-V characteristic 7 for the solar device $2_1$ that includes the open circuit voltage Voc and the operating voltage Vop of the solar device $2_1$, as shown in FIG. 6. Series protection diodes within each of the solar devices $2_1$-$2_n$ or the inherent electrical characteristics of the solar devices $2_1$-$2_n$ typically prevent the current Isd from being negative and may prevent acquisition of a measurement of the open circuit voltage Voc of the solar device $2_1$, at which the current Isd is zero, the acquired set $\{Isd,Vsd\}_2$ of corresponding measurements of the current Isd and measurements of the voltage Vsd in this second measure M2 may be used to extract the open circuit voltage Voc and define the portion of the I-V characteristic 7 where Isd=0, based on curve fitting or other data processing techniques.

While the first measure M1 and the second measure M2 typically each include sets $\{Isd,Vsd\}_1$, $\{Isd,Vsd\}_2$ of corresponding measurements of the current Isd and measurements of the voltage Vsd that are acquired at discrete times within the first and second designated time intervals, respectively, curve fitting techniques, interpolation techniques or extrapolation techniques may be used to establish the I-V characteristic 7 or other electrical characteristic for the particular solar device $2_x$ that is monitored using the solar monitor 100. The first measure M1 may be performed before the second measure M2 is performed, or vice versa. Alternatively, the first measure M1 is performed in the absence of the second measure M2, or the second measure M2 is performed in the absence of the first measure M1.

The designated time intervals during which the measures M1, M2 of electrical characteristics of the solar device $2_1$ are performed are of short duration, so that the solar monitor 100 has negligible impact on the energy production of the PV system 200. The short-duration time intervals of the measures M1, M2 also provides for a low duty cycle for the solar monitor 100, which results in low power dissipation for the elements of the solar monitor 100. Lower power dissipation typically provides corresponding increases in reliability of the solar monitor 100.

Figure 3:
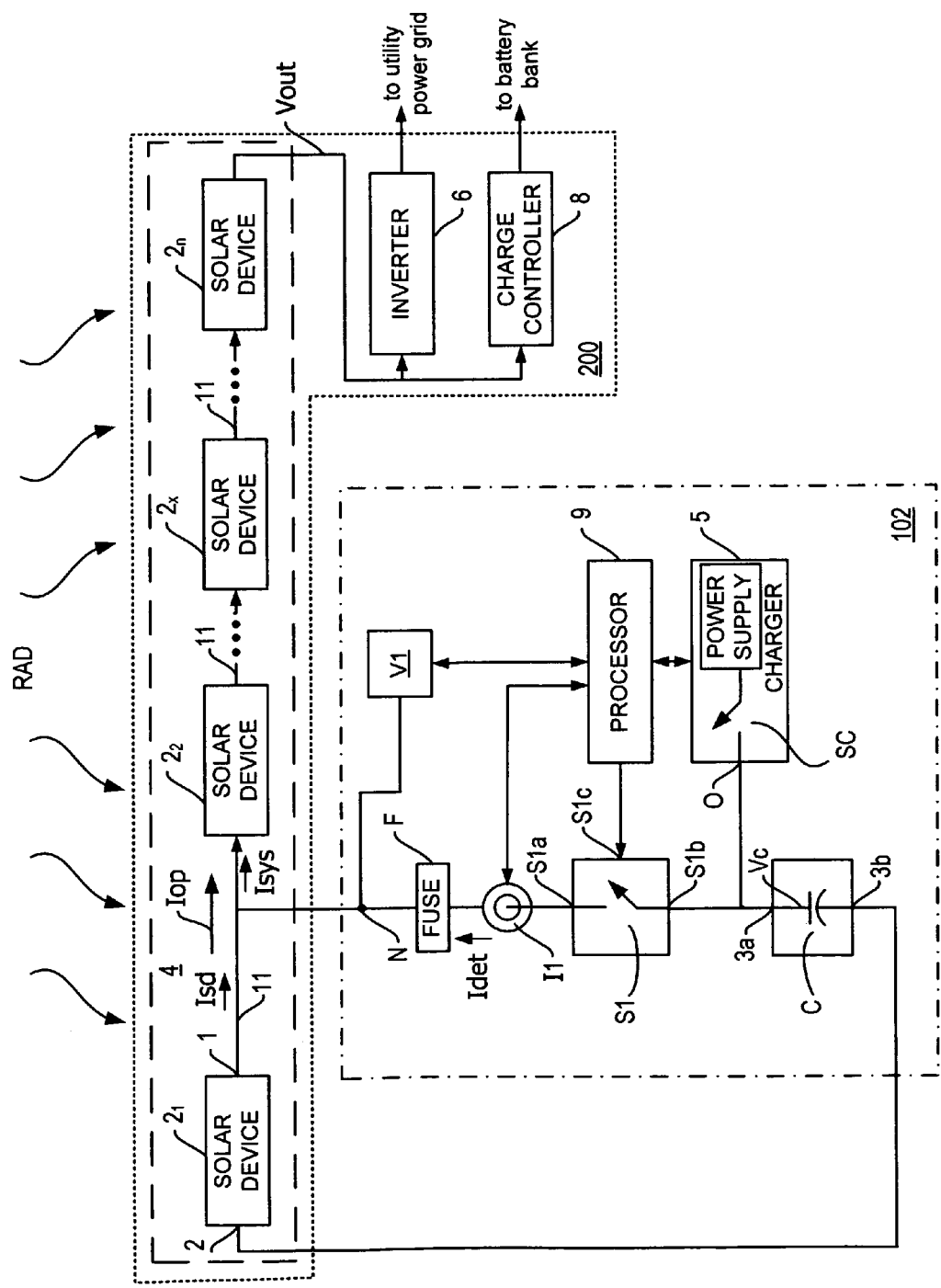

FIG. 3 shows an example of a block diagram of a solar monitor 102 according to alternative embodiments of the present invention. In this example, the current detector I1, the switch S1, and the charge storage element C of the solar monitor 102 are all in a shunt configuration with the solar device $2_1$ and with the subsequent solar device in array 4 of the solar device $2_1$-$2_n$ that are coupled in series and included in the PV system 200. The coupling of all the elements of the solar monitor 102 in the shunt configuration as shown in the example of FIG. 3, isolates failures of the PV system 200 from failures that may occur in the solar monitor 102. The optionally included fuse F further isolates the PV system 200 from failures of the solar monitor 102. The shunt configuration of the current detector I1 and the rest of the elements of the solar monitor 102 also enables the solar monitor 102 to be located remotely from the stringent environmental conditions of the installation sites of the PV system 200, which typically increases reliability of the solar monitor 102.

The first measure M1 of electrical characteristics of the solar device $2_1$ is performed similarly when using the solar monitor 102 as when using the solar monitor 100. Using the solar monitor 102, the first measure M1 also provides the acquired set $\{Isd,Vsd\}_1$ of corresponding measurements of the current Isd and measurements of the voltage Vsd, which may be used to establish the portion of an I-V characteristic 7, or other electrical characteristics for the solar device $2_1$ that includes the short circuit current Isc and the operating voltage Vop of the solar device $2_1$ as shown in FIG. 6. The series protection diodes within each of the solar devices $2_1$-$2_n$ or the inherent electrical characteristics of the solar devices $2_1$-$2_n$ typically prevent current from other solar devices $2_1$-$2_n$ in the array 4 from flowing to the current detector I1, which may otherwise influence the first measure M1 of the electrical characteristics of the solar device $2_1$. Accordingly, the current Isd at port 1 of the solar device $2_1$ flows through the current detector I1 during this first measure M1 of electrical characteristics.

Performing the second measure M2 of the solar device $2_1$ using the configuration shown in FIG. 3 involves additional processing of corresponding measurements of a current Idet measured by the current detector I1 and measurements of the voltage Vsd by the voltage detector V1 to determine the electrical characteristics of the solar device $2_1$. The processor 9 activates the control port S1c to open the switch S1, which establishes a high impedance between the first contact S1a and the second contact S1b. With switch S1 open, the processor 9 configures the charger 5 to provide a positive charge, and corresponding positive voltage, on the first terminal 3a of the charge storage element C. The positive voltage provided to the charge storage element C is sufficient to establish a voltage at the port 1 of the solar device $2_1$ that exceeds the open circuit voltage Voc of the solar device $2_1$. The processor 9 then decouples the charger 5 from the charge storage element C, typically by opening the optionally included switch SC or by otherwise providing a high impedance at the output O of the charger. The processor 9 then activates the control port S1c to close the switch S1, which establishes a low impedance between the first contact S1a and the second contact S1b of the switch S1. The current detector I1 monitors current Idet and the voltage detector V1 then monitors the voltage between the reference and the node N by acquiring a set $\{Idet,Vsd\}$ of corresponding measurements of the current Idet and measurements of the voltage Vsd over a designated time interval. The processor 9 typically processes the acquired set $\{Idet,Vsd\}$ of corresponding measurements of the current Idet and measurements of the voltage Vsd in this second measure M2 of the electrical characteristics to establish the portion of the I-V characteristic 7 for the solar device $2_1$ that includes the open circuit voltage Voc and the operating voltage Vop of the solar device $2_1$. With the current detector I1 in the shunt configuration, the current Isd provided by the solar device $2_1$ is the difference between the current Isys that is provided to the solar devices $2_2$-$2_n$ in the array 4 and the current Idet that is measured by the current detector I1, as shown in equation (1).

$$Isd = Isys - Idet \tag{1}$$

In one example, the processor 9 determines the current Isys as a function of the output voltage Vout of the array 4 based on a measurement of the I-V characteristic 7 of the entire array 4 of solar devices $2_1$-$2_n$ in the PV system 200, typically acquired upon installation of the PV system 200, as shown in equation (2).

$$Isys = Isys(Vout) \tag{2}$$

The positive voltage provided to the charge storage element C results in a voltage Vc equal to the sum of a voltage increment deltaV and the operating voltage Vop of the solar device $2_1$, which may be measured by the voltage detector V1 at the node N. The processor 9 then uses equation (1) and the measure of the I-V characteristic 7 of the array 4 of solar devices $2_1$-$2_n$ in the PV system 200 shown in equation (2) to determine the current Isd according to equation (3).

$$Isd = Isys(VoutOP - deltaV) - Idet \tag{3}$$

The term VoutOP in equation (3) represents the output voltage Vout of the array 4 of the solar devices $2_1$-$2_n$ during operation of the PV system 200, which may be measured with monitoring circuitry (not shown) that is typically included in the inverter 6. Equations (1)-(3) enable the set $\{Isd,Vsd\}_2$ of corresponding measurements of the current Isd and measurements of the voltage Vsd to be established from the acquired set $\{Idet,Vsd\}$ of corresponding measurements of the current Idet and measurements of the voltage Vsd. The processor 9 typically uses this resulting set $\{Isd,Vsd\}_2$ to establish the portion of the I-V characteristic 7 for the solar device $2_1$ that includes the open circuit voltage Voc and the operating voltage Vop of the solar device $2_1$, as shown in FIG. 6.

In another example, the processor 9 establishes the set $\{Isd,Vsd\}_2$ of corresponding measurements of the current Isd and measurements of the voltage Vsd from the acquired set {Idet,Vsd} of corresponding measurements of the current Idet and measurements of the voltage Vsd based on a designation that estimates each of the solar devices $2_1$-$2_n$ in the array 4 to have equivalent electrical characteristics. With this designation, the positive voltage provided to the charge storage element C correspondingly reduces the operating voltage Vop of each of the solar devices $2_2$-$2_n$ in the array 4 by an equal amount. The positive voltage provided to the charge storage element C in this example does not reduce the operating voltage Vop of the solar device $2_1$. The reduction in operating voltage Vop of each of the solar devices $2_2$-$2_n$ results in a voltage V'sd for each of the solar device $2_2$-$2_n$, as shown in Equation (4).

$$V'sd = (Vop - \text{delta}V/(n-1)) \quad (4)$$

The current Isys of the PV system 200 may then be established as shown in Equation (5).

$$Isys = Isd(Vop - \text{delta}V/(n-1)) \quad (5)$$

The current Isd is then obtained from equation (1) using the measured current Idet and the current Isys established in equation (5).

Figure 4:
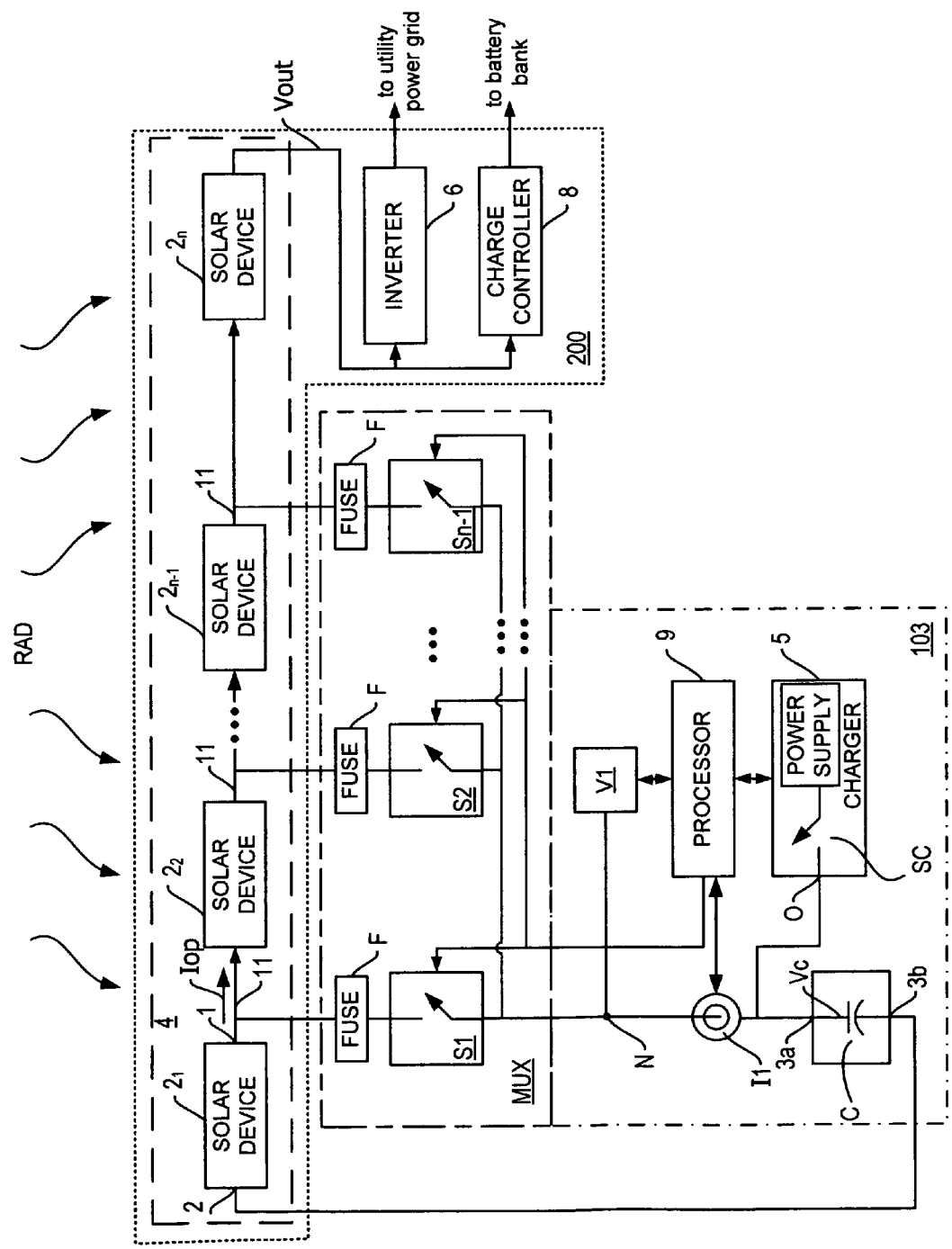

FIG. 4 shows another example of a solar monitor 103 according to alternative embodiments of the present invention. In this example, the solar monitor 103 includes a multiplexer MUX in addition to the other elements that are included in the solar monitor 100 or the solar monitor 102. One or more switches S1-Sn–1 are included in the multiplexer MUX to provide for selective coupling of the charge storage element C to a corresponding one or more solar devices $2_1$-$2_n$ in the array 4 of solar devices $2_1$-$2_n$ that are coupled in series. The multiplexer MUX enables each of the solar devices $2_1$-$2_n$ within the array 4 to be monitored through selective activation of the switches S1-Sn–1 that are included in the multiplexer MUX. To monitor the first solar device $2_1$ in the array 4, the switches S2-Sn–1 in the multiplexer MUX are opened through activation by the processor 9. With the switches S2-Sn–1 open, the measure M1 and the measure M2 are typically performed as in the examples of the solar monitors 100, 102, using the charger 5, the charge storage element C, the current detector I1, the voltage detector V1, and by selectively activating the switch S1 to establish the I-V characteristic 7, or other electrical characteristics for the solar device $2_1$. To monitor the second solar device $2_2$ in the array 4, the switch S1 and the switches S3-Sn–1 in the multiplexer MUX are opened through activation by the processor 9. With the switches S1 and switches S3-Sn–1 open, the measure M1 and the measure M2 are typically performed as in the examples shown for the solar monitors 100, 102 using the charger 5, the charge storage element C, the current detector I1, the voltage detector V1, and by selectively activating the switch S2 to establish a cumulative I-V characteristic 7, or other electrical characteristics for the series combination of the solar device $2_1$ and the solar device $2_2$. Based on a determination of the I-V characteristic 7 for the solar device $2_1$, the I-V characteristic 7 of the solar device $2_2$ may be isolated from the cumulative I-V characteristic 7 established for the series combination of solar devices $2_1$, $2_2$. To monitor the third solar device $2_3$ in the array 4, the switches S1, S2 and the switches S4-Sn–1 in the multiplexer MUX are opened through activation by the processor 9. With the switches S1, S2 and the switches S4-Sn–1 open, the measure M1 and the measure M2 are typically performed as in the examples shown for the solar monitors 100, 102 using the charger 5, the charge storage element C, the current detector I1, the voltage detector V1, and by selectively activating switch S3 to establish the cumulative I-V characteristic, or other electrical characteristics for the series combination of the solar device $2_1$, the solar device $2_2$ and solar device $2_3$. Based on a determination of the I-V characteristic 7 for the solar device $2_1$ and the solar device $2_2$, the I-V characteristic 7 of the solar device $2_3$ may be isolated from the cumulative I-V characteristic 7 established for the solar devices $2_1$-$2_3$. This sequential activation of the switches S1-Sn–1 in the multiplexer MUX may be continued to establish the I-V characteristic 7 for other solar devices $2_1$-$2_n$ in the array 4. Alternatively, the switches S1-Sn–1 in the multiplexer MUX may be activated according to different sequences or activated in isolation to monitor other combinations of one or more of the solar devices $2_1$-$2_n$ in the array 4. The output voltage Vout and current Isys, which may be measured using the monitoring circuitry that is typically included in the inverter 6, may provide a cumulative measure of electrical characteristics for the solar devices $2_1$-$2_n$, including the solar device $2_n$ in the array 4.

In the example shown in FIG. 4, the current detector I1 is shown in a shunt configuration with the solar devices $2_1$-$2_n$. In an alternative example, the current detector I1 is coupled between the solar devices $2_1$-$2_n$ in a series configuration, positioned at the output port 1 of the solar device $2_1$ as shown in the solar monitor 100 of FIG. 1 and FIG. 2.

In an example wherein the PV system 200 includes multiple arrays 4 of solar devices $2_1$-$2_n$, the PV system 200 may also include one or more combiner boxes to bus or otherwise consolidate the outputs or other connections in the multiple arrays 4 to simplify the interface between the arrays 4 and the inverter 6. In this example, the multiplexer MUX may be integrated or otherwise included in the combiner boxes or other type of junction box. This type of integration typically reduces the number of interconnections between the multiplexer MUX and the other elements of the solar monitor 103.

Figure 5:
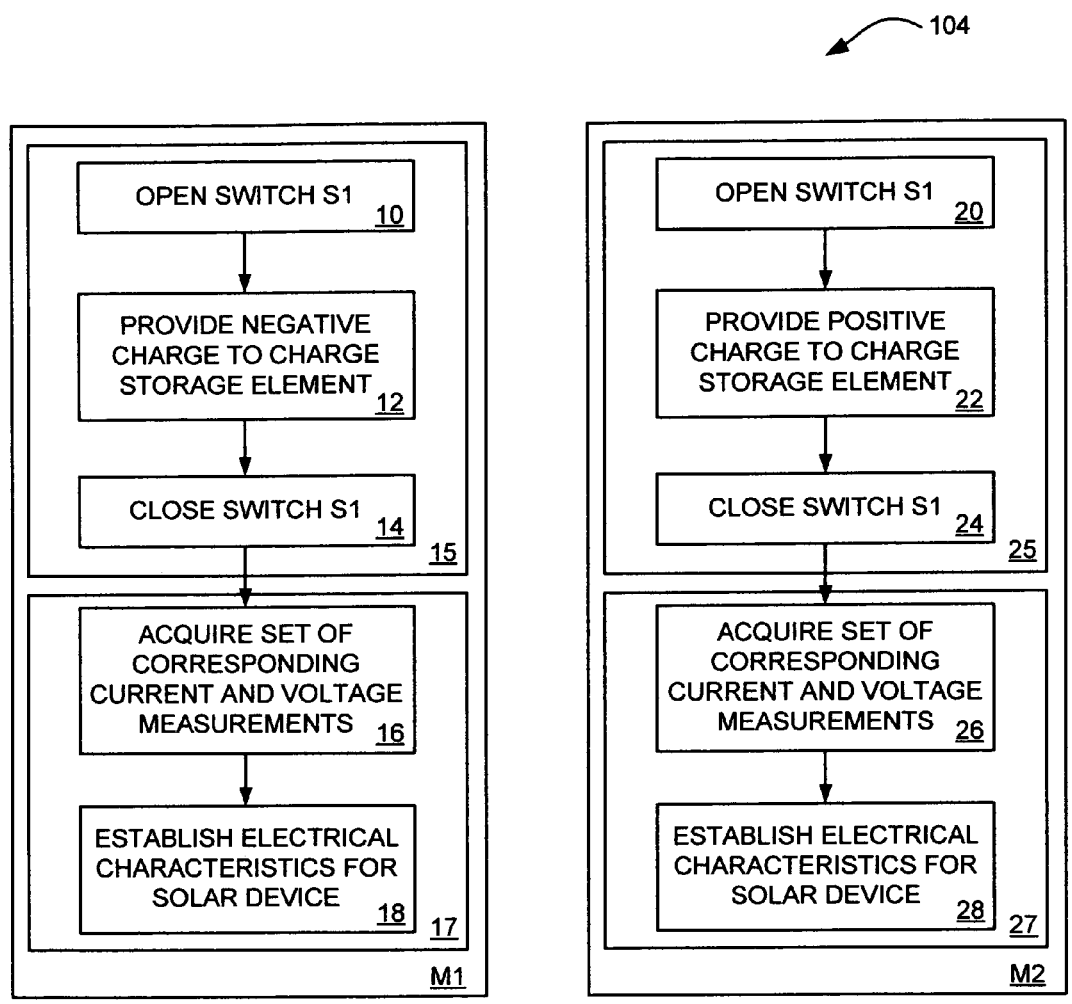
FIG. 5 shows an example of a flow diagram of a solar monitor implemented according to a method, according to alternative embodiments of the present invention.

FIG. 5 shows an example of a flow diagram of a solar monitor implemented according to a method 104, according to alternative embodiments of the present invention. In the method 104, the measure M1 includes coupling a negatively charged charge storage element C in a shunt configuration with the solar device $2_x$ and with the subsequent solar device in the array 4, to decrease the operating current Iop flowing between the designated solar device $2_x$ and the subsequent solar device in the array (15), and measuring the current and voltage of the solar device $2_x$ over a first designated time interval in response to the coupled negatively charged charge storage element (17). Coupling the negatively charged charge storage element C to the solar device $2_x$ (15) typically includes opening the switch S1 to establish a high impedance between the charge storage element C and the solar device $2_x$ (10), providing a negative charge to the charge storage element C (12), and closing the switch S1 to establish a low impedance between the charge storage element C and the solar device $2_x$ (14). Measuring the current and the voltage of the solar device $2_x$ over the first designated time interval in response to the coupled negatively charged charge storage element C (17) typically includes acquiring the set {Isd, Vsd}$_1$ of corresponding measurements of the current Isd and measurements of the voltage Vsd (16) and establishing a first portion of the I-V characteristic 7, or other electrical characteristic for the solar device $2_x$ (18).

In the method 104, the measure M2 includes coupling a positively charged charge storage element C in a shunt configuration with the solar device $2_x$ and with the subsequent solar device in the array 4, to increase the operating current Iop flowing between the designated solar device $2_x$ and the subsequent solar device in the array 4 (25), and measuring the current and the voltage of the solar device $2_x$ over a second designated time interval in response to the coupled positively charged charge storage element C (27). Coupling the positively charged charge storage element C to the solar device $2_x$ (25) typically includes opening the switch S1 to establish a high impedance between the charge storage element C and the solar device $2_x$ (20), providing a positive charge to the charge storage element C (22), and closing the switch S1 to establish a low impedance between the charge storage element and the solar device $2_x$ (24). Measuring the current and the voltage of the solar device $2_x$ over the second designated time interval in response to the coupled positively charged charge storage element C (27) typically includes acquiring the set $\{Isd, Vsd\}_2$ of corresponding measurements of the current Isd and measurements of the voltage Vsd (26) and establishing a portion of an I-V characteristic 7, or other electrical characteristic for the solar device $2_x$ (28).

The measure M1 and the measure M2 of electrical characteristics of the solar device $2_x$ are typically performed in the operating environment of the PV system 200, during operation of the PV system 200. During operation, the operating current Iop flows between the solar device $2x$ and the subsequent solar device in the array 4 of the solar devices $2_1$-$2_n$ that are coupled in series. The operating current Iop is typically provided by the two or more solar devices $2_1$-$2_n$ and flows in series through the solar devices $2_1$-$2_n$ in response to the incident solar radiation RAD. Alternatively, the measures M1, M2 are acquired in the absence of incident solar radiation RAD on the solar device $2_x$, for example by blocking illumination to the solar device $2_x$ to establish the "dark" current-voltage measurement for the solar device $2_x$. The measures M1, M2 may also be acquired in the absence of incident solar radiation RAD on one or more of the solar devices $2_1$-$2_n$ to establish a "dark" current-voltage measurement for the one or more of the solar devices $2_1$-$2_n$. Dark current-voltage measurements, as described in "*Dark Current-Voltage Measurements on Photovoltaic Modules as a Diagnostic or Manufacturing Tool*" by D. L. King et al., presented at the $26^{th}$ IEEE Photovoltaic Specialists Conference, Sep. 29-Oct. 3, 1997, Anaheim, Calif., enable determination of series resistance, shunt resistance, diode factor, diode saturation currents or other parameters that dictate performance, establish or indicate performance, or otherwise influence performance of the solar device $2_x$.

The elements of the solar monitors 100-104 are shown separate from the PV system 200 in FIGS. 1-5. According to alternative embodiments of the present invention, the processor 9 is implemented using a computer or other processor and associated memory present within the inverter 6. The current detector I1, the voltage detectors V1, V2 may also be implemented using circuitry, or modifications of circuitry that is included within the inverter 6. One or more of the elements, or the functions of one or more elements, of the solar monitors 100-104 may be fully integrated, partially integrated, or otherwise included or distributed within the inverter 6 or within other elements of the PV system 200. In addition, coupling between the elements of the solar monitors 100-104, or coupling between elements of the solar monitors 100-104 and the PV system 200 typically refers to direct connections, indirect connections, connections through interposed devices, or other arrangements or configurations of elements that place the elements that are coupled in signal communication with each other. The I-V characteristic 7 obtained using the solar monitors 100-104 is shown as an example of an electrical characteristic that is suitable to monitor or otherwise indicate the performance of one or more of the solar devices $2_1$-$2_n$. Any other suitable electrical characteristic acquired using the current detector I1, the voltage detector V1, or other elements of the solar monitors 100-104 is alternatively obtained or established according to the embodiments of the present invention.

While the embodiments of the present invention have been illustrated in detail, it should be apparent that modifications and adaptations to these embodiments may occur to one skilled in the art without departing from the scope of the present invention as set forth in the following claims.

The invention claimed is:

1. A solar monitor, comprising:
   a switch having a first contact coupled to a first port of a first solar device, the first port being disposed between the first solar device and a subsequent solar device connected in series within an array of operating solar devices, wherein the switch is coupled to the first port in shunt configuration between the first solar device and the subsequent solar device, the switch varying an operating current flowing between the first solar device and the subsequent solar device;
   a charge storage element having a first terminal coupled to a second contact of the switch and having a second terminal coupled to a second port of the first solar device;
   a charger coupled to the first terminal of the charge storage element;
   a voltage detector having a first lead and a second lead, the first lead being coupled to a node located between the first terminal of the charge storage element and the first port of the first solar device, and the second lead being coupled to one of: a reference or ground, the voltage detector being configured to measure a voltage of the first solar device;
   a current detector configured to measure a current through the first port of the first solar device; and
   a processor, the processor associated with at least one of: the switch, the charger, the current detector, and the voltage detector;
   wherein the solar monitor is adapted to monitor current and voltage characteristics of the first solar device.

2. The solar monitor of claim 1 wherein the switch is coupled to the first port of the first solar device through a fuse.

3. The solar monitor of claim 1 wherein the charger establishes a voltage on the charge storage device when the switch is open.

4. The solar monitor of claim 1 wherein the switch is open while the charger provides a negative charge to the first terminal of the charge storage element, wherein the switch is closed while the voltage detector measures a voltage at the node and while the current detector measures the current at the first port of the first solar device, and wherein varying the operating current flowing between the first solar device and the subsequent solar device includes decreasing the operating current in response to the negative charge when the switch is closed.

5. The solar monitor of claim 1 wherein the switch is open while the charger provides a positive charge to the first terminal of the charge storage element, wherein the switch is closed while the voltage detector measures a voltage at the node and while the current detector measures the current at the first port of the first solar device, and wherein varying the operating current flowing between the first solar device and the subsequent solar device includes increasing the operating current in response to the positive charge when the switch is closed.

6. The solar monitor of claim 4 wherein the switch is open while the charger provides a positive charge to the first terminal of the charge storage element, wherein the switch is closed while the voltage detector measures a voltage at the node and while the current detector measures the current at the first port of the first solar device, and wherein varying the operating current flowing between the first solar device and the subsequent solar device includes increasing the operating current in response to the positive charge when the switch is closed.

7. The solar monitor of claim 5 wherein the positive charge establishes a corresponding positive voltage on the charge storage element that exceeds an open circuit voltage of the first solar device.

8. The solar monitor of claim 1 wherein the current detector includes a resistive element interposed between the first port of the first solar device and the subsequent solar device, a first voltage detector coupled to a first terminal of the resistive element, and a second voltage detector coupled to a second terminal of the resistive element.

9. The solar monitor of claim 8 wherein the resistive element is established by a designated length of a conductor that couples to the first port of the first solar device.

10. The solar monitor of claim 1 wherein the current detector is in a shunt configuration with the first port of the first solar device and the subsequent solar device in the array of operating solar devices that are coupled in series.

11. The solar monitor of claim 1 wherein the current detector is in a series configuration with the first port of the first solar device and the subsequent solar device in the array of operating solar devices that are coupled in series.

12. A solar monitor, comprising: a charge storage element; a charger coupled to the charge storage element to establish at least one of a positive voltage and a negative voltage on the charge storage element; a switch adapted to couple in a shunt configuration between a first solar panel and a subsequent solar device in an array of operating solar devices that are coupled in series, the switch adapted to selectively couple the charge storage element to the first solar panel and to vary an operating current flowing between the first solar panel and the subsequent solar device in response to the at least one of the positive voltage and the negative voltage; a voltage detector adapted to measure a voltage of the first solar panel; and a current detector adapted to measure a current of the first solar panel.

13. The solar monitor of claim 12 wherein the switch is included in a multiplexer that provides for selective coupling of the charge storage element to a corresponding one or more solar devices in the array of solar devices that are coupled in series.

14. The solar monitor of claim 12 wherein the current detector is in a shunt configuration with the first solar panel and the subsequent solar device in the array of operating solar devices that are coupled in series.

15. The solar monitor of claim 12 wherein the current detector is in a series configuration with the first solar panel and the subsequent solar device in the array of operating solar devices that are coupled in series.

16. The solar monitor of claim 12 wherein the switch is adapted to selectively couple the charge storage element to the first solar panel through a fuse.

17. A solar monitoring method, comprising: coupling a switch in a shunt configuration with a first solar device and a subsequent solar device in an array of solar devices that are coupled in series, the switch being further coupled to at least one of a positively charged and a negatively charged charge storage element, wherein the switch, and the at least one of a positively charged and a negatively charged charge storage element are adapted to vary an operating current flowing between the first solar device and the subsequent solar device; and measuring a current and a voltage of the first solar device over a corresponding time interval in response to the at least one of the positively charged and the negatively charged charge storage element.

18. The solar monitoring method of claim 17 wherein coupling the negatively charged charge storage element includes establishing a high impedance between the charge storage element and the first solar device, providing a negative charge to the charge storage element, and establishing a low impedance between the charge storage element and the first solar device, wherein to vary the operating current flowing between the first solar device and the subsequent solar device includes decreasing the operating current in response to the negative charge, and wherein coupling the positively charged charge storage element includes establishing a high impedance between the charge storage element and the first solar device, providing a positive charge to the charge storage element, and establishing a low impedance between the charge storage element and the first solar device and wherein to vary the operating current flowing between the first solar device and the subsequent solar device includes increasing the operating current in response to the positive charge.

19. The solar monitoring method of claim 17 wherein measuring the current and the voltage of the first solar device over a corresponding time interval in response to the at least one of the positively charged and the negatively charged charge storage element includes acquiring a set of corresponding measurements of the current and the voltage of the solar device to establish an electrical characteristic for the solar device.

20. The solar monitoring method of claim 19 wherein the electrical characteristic includes an I-V characteristic for the first solar device.

* * * * *